US007294223B2

(12) United States Patent
Hilton et al.

(10) Patent No.: US 7,294,223 B2
(45) Date of Patent: Nov. 13, 2007

(54) METHOD FOR ATTACHING A FLUID CONTAINER TO A FLUID EJECTOR IN A FLUID EJECTION DEVICE

(75) Inventors: Brian S. Hilton, Rochester, NY (US); Eric A. Merz, Palmyra, NY (US); Takatoshi Tsuchiya, Fujisawa (JP); Hiroki Murakami, Fujisawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 244 days.

(21) Appl. No.: 10/766,008

(22) Filed: Jan. 29, 2004

(65) Prior Publication Data

US 2005/0168508 A1 Aug. 4, 2005

(51) Int. Cl.
*B29C 65/00* (2006.01)

(52) U.S. Cl. .................. 156/309.6; 156/221; 156/293; 156/303.1; 156/308.2; 264/249; 264/445; 347/20; 347/87

(58) Field of Classification Search ............ 156/309.6, 156/221, 293, 308.2, 294, 303.1; 264/249, 264/445; 347/20, 87; 228/136; 29/509
See application file for complete search history.

(56) References Cited

U.S. PATENT DOCUMENTS 4,859,378 A * 8/1989 Wolcott ...................... 264/445
5,519,425 A * 5/1996 Dietl et al. ................... 347/87
5,538,680 A * 7/1996 Enders ....................... 264/516
5,794,878 A * 8/1998 Carpenter et al. .......... 242/381
6,460,965 B2 10/2002 Ikegami et al.
2005/0006548 A1* 1/2005 Goh et al. .................. 248/317

* cited by examiner

*Primary Examiner*—John L Goff
(74) *Attorney, Agent, or Firm*—Oliff & Berridge, PLC

(57) ABSTRACT

A method for joining fluid containers and fluid ejectors in a fluid ejecting device are provided. The fluid container includes one or more heat stakes and a substrate includes one or more apertures for receiving the heat stakes and one or more three-dimensional features in the vicinity of the one or more apertures. The fluid ejector and optionally an elastic member are interposed between the fluid container and the substrate. Thermal energy is applied to the one or more heat stakes so that the one or more heat stakes soften to occupy the apertures and three-dimensional features of the substrate and pressure is applied to maintain contact between the fluid container, elastic member, fluid ejector and substrate. The present invention is also directed to substrate including one or more apertures for receiving heat stakes and one or more three-dimensional features in the vicinity of the one or more apertures.

17 Claims, 7 Drawing Sheets

METHOD FOR ATTACHING A FLUID CONTAINER TO A FLUID EJECTOR IN A FLUID EJECTION DEVICE

BACKGROUND OF THE INVENTION

1. Field of Invention

This invention is directed to fluid ejection devices. In particular, this invention is directed to methods for attaching fluid containers to fluid ejectors in fluid ejection devices.

2. Description of Related Art

Inkjet printing devices have gained prominence in printing as a result of their capabilities in performing quality, economical color and monochromatic printing. Inkjet printing devices include, but are not limited to, piezoelectric inkjet printing devices and thermal inkjet printing devices. Piezoelectric inkjet devices eject ink from a nozzle by mechanically generating pressure to deform an ink chamber. Thermal inkjet devices eject ink by energizing a heater element to vaporize ink.

In such inkjet printing devices, a die module, which acts to eject ink onto a recording medium, is joined to an ink manifold. That is, ink is supplied from the ink manifold to the die module via an ink supply interface between the ink manifold and the die module. The ink supplied to the die module is then ejected from one or more fluid passages in the die module.

Various methods are known for attaching the ink manifold to the die module. For example, the ink manifold and the die module can be sealed together using an adhesive. Other methods of attaching the ink manifold to the die module are also known. Such methods include providing an organic material between the ink manifold and the die module and sealing the three components together by ultrasonic welding. Also, the ink manifold and the die module could be sealed together by conventional heat staking methods.

A further method of sealing an ink manifold to a die module is disclosed in U.S. Pat. No. 6,460,965, which is incorporated herein by reference in its entirety. This method involves interposing an elastic member between the ink manifold and the die module and applying pressure to hold the seal. Pressure can be applied using bolts.

The above described methods of sealing an ink manifold to a die module have various deficiencies. For example, the use of adhesives requires that the amount of adhesive used and the positions of the ink manifold and die module be strictly managed during assembly. Controlling these aspects of manufacture increases cost and time of manufacture, while failure to control them can have adverse effects on print quality of the resulting printing device. Also, in the instance of heat cured adhesives, applied thermal energy can adversely affect the integrity of the adhered parts, again resulting in reduced print quality.

Some methods, such as the method disclosed in U.S. Pat. No. 6,460,965, are deficient in that they do not permit precise control over the distance between the ink manifold and the die module and/or the pressure with which the ink manifold and die module are joined. Sealing ink manifolds to die modules by ultrasonic welding or conventional heat staking also present similar difficulties. For example, both ultrasonic welding and heat staking introduce mechanical and thermal stresses that can adversely affect printing performance in the resulting printing devices. In addition, conventional heat staking methods do not allow precise control over the distance between the ink manifold and the die module and/or the pressure with which the ink manifold and die module are joined.

The difficulty in managing accurate position and/or pressure with conventional heat staking arises due to the interface between the heat staking material and the substrate that is being “staked.” As shown in FIG. 1, a thermoplastic heat stake 11 is used to stake an object (not shown) to a metal substrate 12. The heat stake 11 is inserted into an aperture 13 in the substrate 12. So that the heat stake 11 will fit into the aperture 13, the heat stake 11 has a diameter that is smaller than the diameter of the aperture 13. This difference in diameter between the heat stake 11 and the aperture 13 results in a first gap 14 between the heat stake 11 and an inner surface of the aperture 13.

When the object and the substrate 12 have been assembled with an end of the heat stake 11 protruding through the aperture, heat energy is applied to deform that end. The deformed end of the heat stake 11 prevents the heat stake 11 from being removed from the aperture 13, and thus binds the object to the substrate 12. However, after application of thermal energy ceases, the heat stake 11 cools unevenly. The portions of the heat stake 11 in contact with the substrate 12 cool more quickly than other parts of the heat stake 11. As a result, the portions of the heat stake 11 in contact with the substrate 13 tend to pull away from the substrate 12, leaving a second gap 15. The second gap 15 results in a reduction of the applied pressure holding the object to the substrate 13. This reduced pressure, in turn, causes a reduction in the friction between the heat stake 11 and the substrate 12 that allows the heat stake 11 to move in a direction normal to the direction in which the object and the substrate 13 are attached in the space left by the first gap 14. Accordingly, the presence of the first and second gaps 14, 15 permits play between the object and the substrate 12 after attachment is complete. This play is one of the causes of imprecise control of position and/or pressure between the staked elements.

SUMMARY OF THE INVENTION

Notwithstanding the merits of the above methods, there is still a need for a suitable method for sealing fluid containers to fluid ejectors in fluid ejection devices. In particular, there is a need for a method for sealing fluid containers to fluid ejectors that allows for precise control over the positions of the fluid container and the fluid ejector and the pressure with which the fluid container and fluid ejector are joined to achieve economical, quality manufacture of fluid ejection devices. The present invention meets these needs.

The present invention is directed to methods for joining fluid containers and fluid ejectors in fluid ejection devices. The present invention is also directed to inkjet cartridges and printing devices manufactured by such methods.

In various exemplary embodiments, the method for joining fluid containers (e.g., an ink manifold of an inkjet printer cartridge) and fluid ejectors (e.g., a die module of an inkjet printer cartridge) according to this invention includes providing a fluid container, an elastic member (e.g., a compression seal), a fluid ejector and a substrate (e.g., a heat sink). In various exemplary embodiments, the fluid container includes one or more heat stakes. In various exemplary embodiments, the substrate includes one or more apertures for receiving the heat stakes. In various exemplary embodiments, the substrate also includes one or more three-dimensional features in the vicinity of the one or more apertures. In various exemplary embodiments, the elastic member is interposed between the fluid container and the fluid ejector and the fluid ejector is interposed between the elastic member and the substrate. In various exemplary embodiments, thermal energy is applied to the one or more heat stakes so that the one or more heat stakes soften to occupy the apertures and three-dimensional features of the substrate and pressure is applied to maintain contact between the fluid container, elastic member, fluid ejector and substrate.

The present invention is also directed to substrates including one or more apertures for receiving heat stakes and one or more three-dimensional features in the vicinity of the one or more apertures, as employed in the methods for joining fluid containers and fluid ejectors in fluid ejection devices according to this invention.

In various exemplary embodiments, the inkjet cartridges according to this invention are manufactured employing the method for joining fluid containers and fluid ejectors according to this invention.

In various exemplary embodiments, the printing devices according to this invention include inkjet cartridges manufactured employing the method for joining fluid containers and fluid ejectors according to this invention.

For a better understanding of the invention as well as other aspects and further features thereof, reference is made to the following drawings and descriptions.

BRIEF DESCRIPTION OF THE DRAWINGS

Various exemplary embodiments of the invention will be described in detail with reference to the following figures, wherein.

DETAILED DESCRIPTION OF EXEMPLARY EMBODIMENTS

While the descriptions below refer to one specific type of fluid ejection system, i.e., an inkjet printer cartridge, the following descriptions of various exemplary embodiments of the fluid ejection devices according to this invention employ structural configurations that are usable in other fluid ejection systems and/or other technologies that store and consume fluids (e.g., fuel cells, assays of biomaterials). As applied herein, fluids refer to non-vapor (i.e., relatively incompressible) flowable media, such as liquids, slurries and gels. It should be appreciated that the principles of this invention, as outlined and/or discussed below, can be similarly applied to any known or later-developed fluid ejection systems, beyond the inkjet cartridges specifically discussed herein.

In addition, the principles employed in the methods for joining fluid containers and fluid ejectors described herein are applicable in other contexts. That is, the principles employed in the methods for joining fluid containers and fluid ejectors according to this invention, particularly the use of heat staking control features, can be applied to join any two or more dissimilar materials. Accordingly, it is intended that the present invention encompass methods for joining dissimilar materials for precision alignment.

Figure 2:
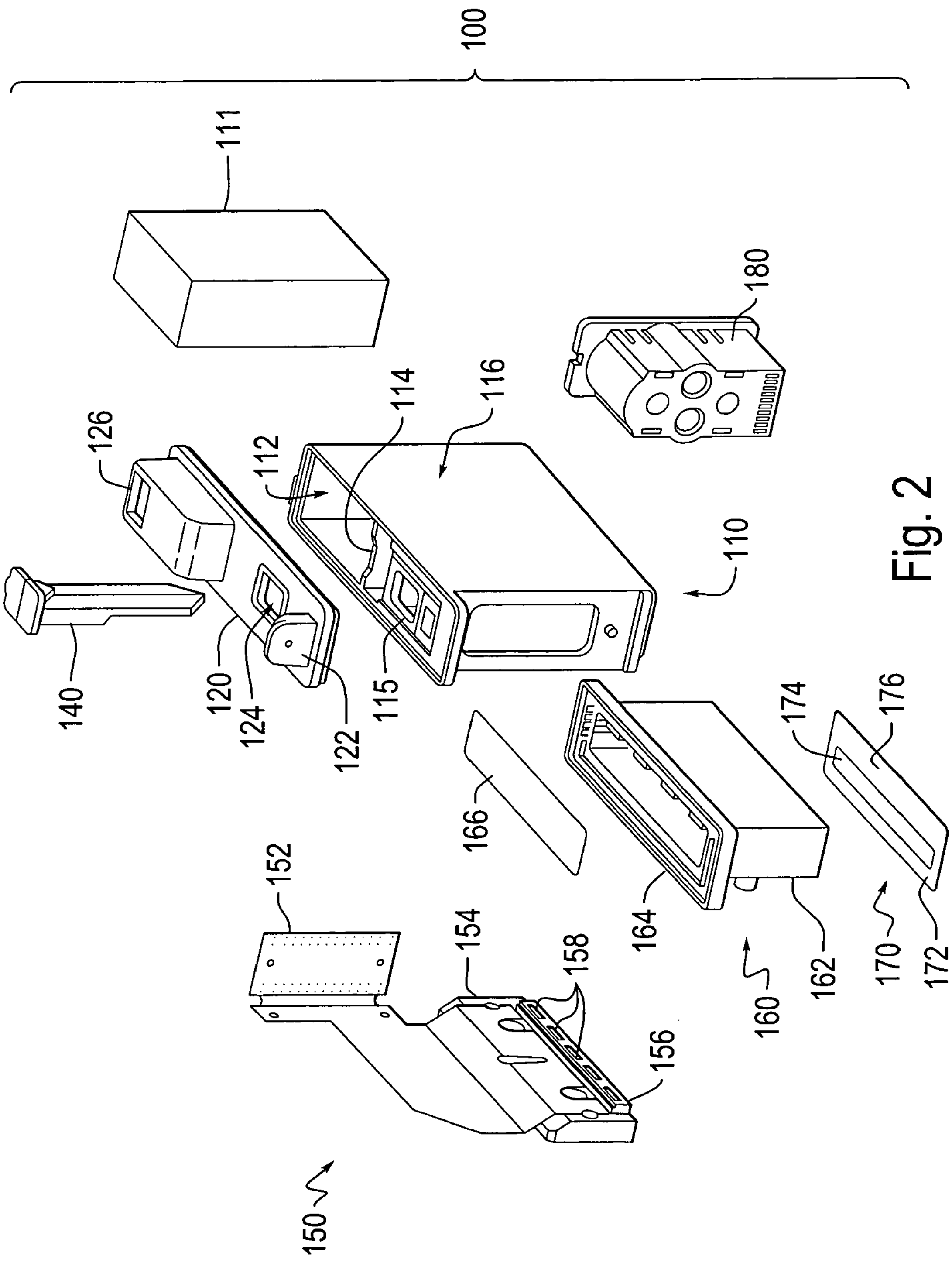
FIG. 2 shows an exploded view of an exemplary embodiment of an inkjet cartridge according to this invention.

FIG. 2 shows an isometric exploded view of an inkjet printer cartridge 100. The inkjet printer cartridge 100 includes an ink container 110, a cover 120, a fluid-level-measuring prism 140, a fluid ejection interface module 150, a manifold 160, a face tape 170 and a refill port 180. A capillary medium insert 111 can be inserted into the ink container 110.

The ink container 110 includes a cartridge medium chamber 112 and a free chamber 116. The capillary medium insert 111 can be received into the cartridge medium chamber 112 through an open top before the cover 120 is disposed on the ink container 110. Above the free chamber 116 is disposed a frame 115 that receives the prism 140. A partition 114 separates the cartridge medium chamber 112 and the free chamber 116 to enable separate fluid levels in the two divided chambers, but enabling fluid to communicate under the partition 114 along a bottom gap (not shown). The bottom gap provides a passage for the fluid between the cartridge medium and free chambers 112 and 116. The free chamber 116 is otherwise isolated, while the cartridge medium chamber 112 is connected to the ventilation port 122 to enable air to communicate therebetween. Thus, the cartridge medium chamber 112 acts as a check valve to the free chamber 116, to enable fluid to pass, while preventing air to enter the free chamber 116 until the fluid level in the cartridge medium chamber 112 falls beneath the partition 114.

The capillary medium insert 111 allows the fluid to migrate from a wet region to a dry region by means of capillary wicking, such as for foam or felt materials. Such capillary media enable negative gauge pressure within the ink container 110. A vent path is connected to the top of the capillary medium insert 111 to allow the fluid to be removed therefrom, and be displaced by air.

The cover 120 includes a ventilation port 122, a prism window 124 and a bridge 126. The prism 140 can be received into the prism window 124 and inserted into the free chamber 116 within the frame 115. The ventilation port 122 includes orifices connecting from outside to inside the inkjet printer cartridge 100 for equilibrating the cartridge medium chamber 112 to ambient pressure.

The interface 150 includes a flexible circuit 152, a heatsink 154 and an ejection chip 156 having intake ports 158. The flexible circuit 152 provides the communication path for signals to eject fluid on command. The heatsink 154 attenuates the temperature response from heating by electrical resistance. Adjoining the heatsink 154 is the ejection chip 156. The intake ports 158 provide passage for fluid to be controllably released by fluid ejection nozzles (not shown) onto a medium (also not shown).

The manifold 160 includes a manifold container 162 and a manifold rim 164. The ink container 110 communicates fluid to the manifold 160 through a filter 166 that is disposed within the manifold rim 164. The bottoms of the heatsink 154, the ejection chip 156 and the manifold container 162 are overlaid by a face tape 170 that provides an interface seal. The face tape 170 includes a heatsink portion 172 covering the bottom of the heatsink 154, an open region 174 to enable the ejection chip 156 to pass fluid out from the fluid ejection nozzles onto the medium, and a manifold portion 176 covering the bottom of the manifold container 162. The fluid passes from the ink container 110 through the filter 166 to the manifold container 162. The fluid is released from the manifold container 162 to the ejection chip 156 through the intake ports 158.

The refill port 180 can be mounted to the ink container 110 along a wall shared by the free chamber 116. The refill port 180 provides an access from which to initially fill the ink container 110 during original manufacture. The refill port 180 also provides the access from which to refill the ink container 110 with fluid after the previously supplied fluid has been expended.

When initially filling the ink container 110 with fluid, the ventilation port 122 is sealed by a gasket, and internal air is evacuated from the ink container 110 to form at least a partial vacuum at a negative gauge pressure (i.e., below ambient pressure). The fluid is transferred through the refill port 180 into the free chamber 116. As the free chamber 116 is filled, some of the fluid passes under the partition 114 into the cartridge medium chamber 112. Upon filling the free chamber 116, a small air bubble (resulting from incomplete evacuation) remains in the free chamber 116, with the remainder of the free chamber 116 containing the fluid. Meantime, the cartridge medium chamber 112 is about half to two-thirds filled with fluid.

During transport and/or initial installation, the ambient pressure and temperature can vary (e.g., decrease in barometric pressure from changes in altitude, or temperature rise during a diurnal cycle or latitude change). Such environments can cause pressure changes in the cartridge medium chamber 112 from the conditions during the initial filling operation. The changes in internal pressure in the cartridge medium chamber 112 can cause the fluid to expand and migrate through the ventilation port 122. Also, changes in orientation of the inkjet printer cartridge 100 can cause gravity-induced flow to the upper regions of the cartridge medium chamber 112 and into through the ventilation port 122. Fluid escaping through the ventilation port 122 can cause undesired leakage of fluid out of the cartridge reservoir 110. Various exemplary embodiments of this invention are designed to inhibit or prevent such potential leaks.

Additionally, passages in the ventilation port 122 should be clear of obstacles so that air can communicate from ambient conditions to the cartridge medium chamber 112. While printing, for example, the fluid is expended through the ejection chip 156 being drawn from the manifold chamber 162. The fluid in the manifold chamber 162 is supplied from the ink container 110, through free chamber 116 and/or the cartridge medium chamber 112. As the free chamber 116 is being emptied of the fluid, the cartridge medium chamber 112 replenishes the fluid from under the partition 114.

During this siphoning, the fluid level of the free chamber 116 rises while the fluid level of the cartridge medium chamber 112 drops, and ambient air enters from the ventilation port 122 into the cartridge medium chamber 112 to equilibrate the pressure. The fluid levels thereby equilibrate in a manner analogous to a monometer. During operation of a fluid printhead, the ink container 110, which maintains a constant internal volume, must be vented in order to allow the fluid to be removed, and therefore maintain a steady delivery pressure of the fluid to the nozzles. Without ambient air entering the cartridge medium chamber to replace the fluid that replenishes the free chamber 116, the fluid would become trapped by the lower pressure in the ink container 110, and propagated to the manifold chamber 162 and to the ejection chip 156. Thus, the ventilation port 122 must enable passage of air without obstruction from the fluid.

Figure 3:
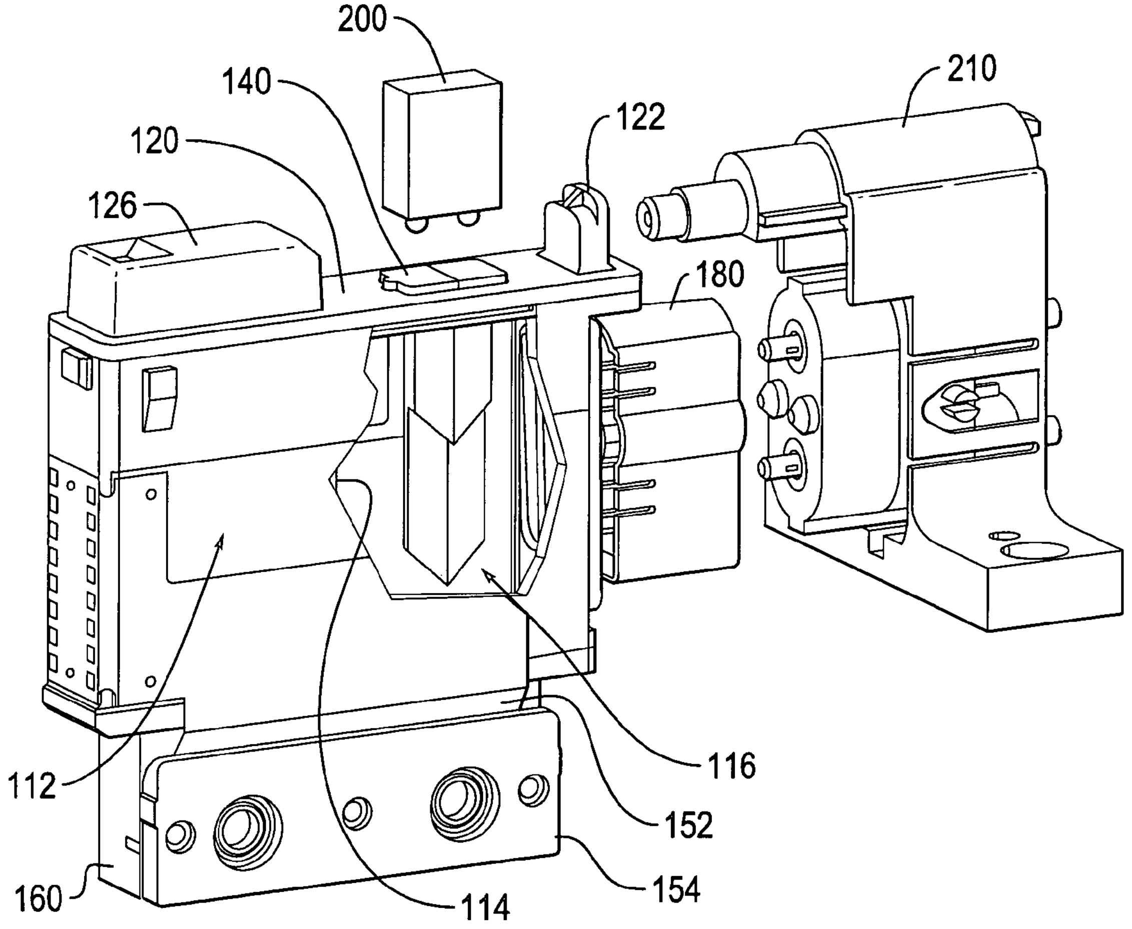
FIG. 3 shows an isometric view of an exemplary embodiment of an inkjet cartridge according to this invention.

FIG. 3 shows the inkjet printer cartridge 100 of FIG. 2 and an associated cartridge refill system. A sensor 200 provides a light source and receiver for determining a level of fluid within the free chamber 116. A refill station 210 provides instruments to engage the ventilation port 122 and the refill port 180 in order to refill the ink container 110 to appropriate levels.

Figure 4A:
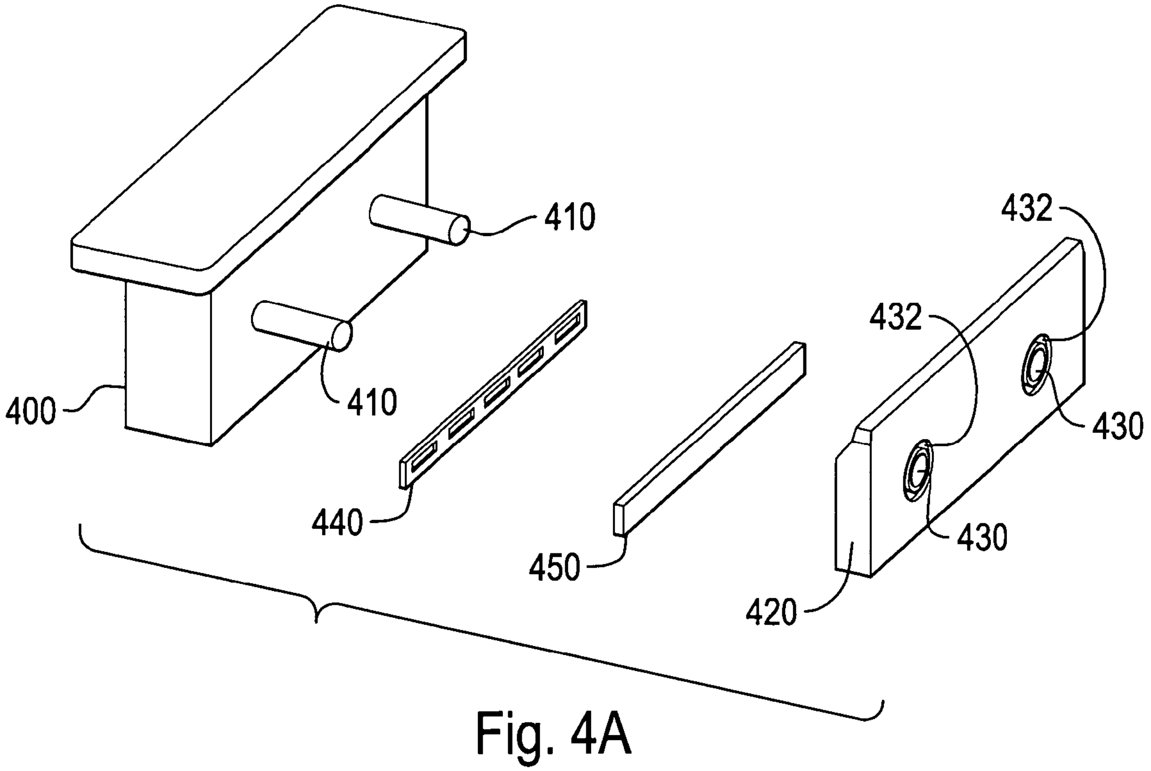
FIG. 4A shows an ink manifold, a compression seal, a die module and an exemplary embodiment of the heat sink according to this invention, prior to joining by an exemplary embodiment of the method according to this invention.

FIG. 4A shows an ink manifold 400, a compression seal 440, a die module 450 and an exemplary embodiment of the heat sink 420 according to this invention. The ink manifold 400 includes heat stakes 410 protruding from the body of the ink manifold 400. The heat sink 420 includes apertures 430 for receiving the heat stakes 410. The heat sink 420 is provided with circular grooves 432 in a face of the heat sink 420 each surrounding a respective aperture 430. In various exemplary embodiments of the method for joining a fluid container and a fluid ejector according to this invention, the compression seal 440 is interposed between the ink manifold 400 and the die module 450. In various exemplary embodiments, the die module 450 is interposed between the compression seal 440 and the heat sink 420. With the ink manifold 400, compression seal 440, die module 450 and heat sink 420 so arranged, the heat stakes 410 are inserted into the apertures 430 of the heat sink 420 so that an end of each heat stake 410 protrudes from a respective aperture 430. In various exemplary embodiments, the ink manifold 400, compression seal 440, die module 450 and heat sink 420 are held together with force applied in the direction the respective parts are to be attached, and thermal energy is applied to the protruding ends of the heat stakes 410 so that ends are deformed to at least partially fill the apertures 430 and the circular grooves 432 surrounding the apertures 430.

Figure 1:
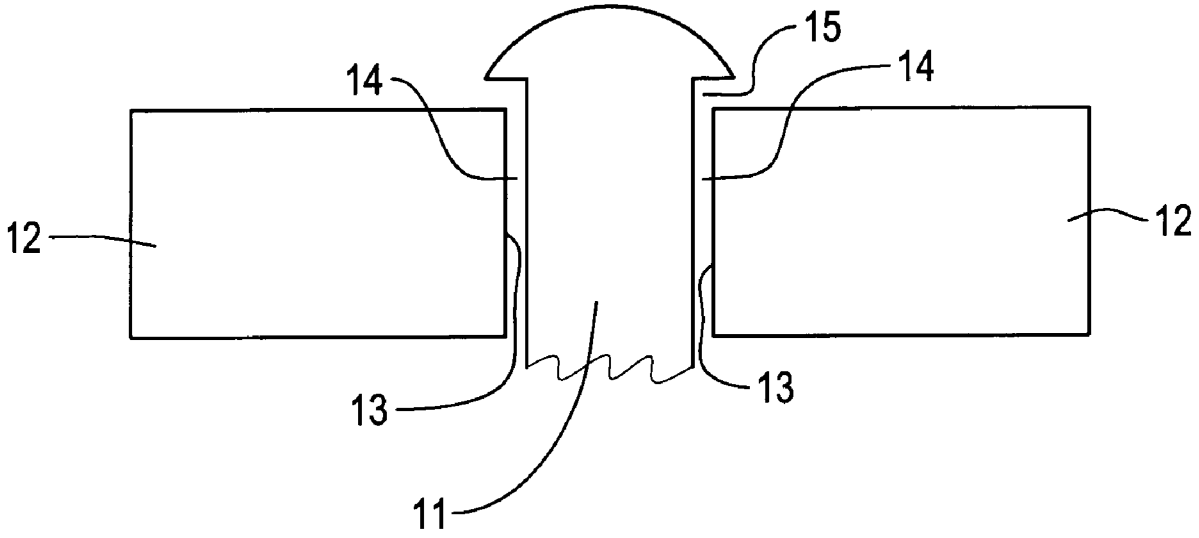
Fig. 1 Prior Art
FIG. 1 shows a schematic cross section of a heat stake and a substrate joined by conventional means.
Figure 4B:
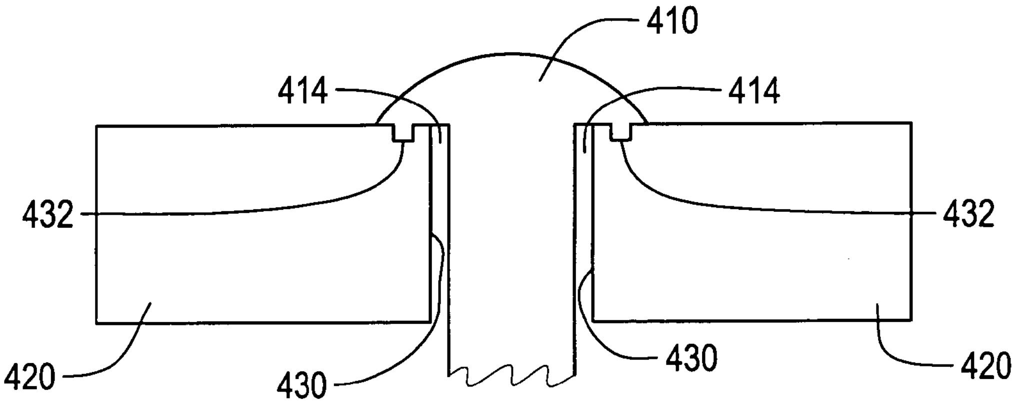
FIG. 4B shows a schematic cross section view of a heat stake joined to an exemplary embodiment of the heat sink according to this invention, after joining by an exemplary embodiment of the method according to this invention.

FIG. 4B shows a schematic cross section view of one of the heat stakes 410 deformed to occupy one of the apertures 430 of the heat sink 420 and the circular groove 432 surrounding that aperture 430. As described above, the heat sink 420 is provided with a three-dimensional feature (in this case with circular grooves 432) in the vicinity of the apertures 430. By virtue of the presence of each circular groove 432, the molten end of the heat stake 410 can contact surfaces both normal and parallel to the direction in which the above-described components 410, 440, 450, 420 are attached as the molten end cools. This contact with the circular groove 432 can prevent the creation of a gap, such as the gap 15 shown in FIG. 1. The contact between the molten end of the heat stake 410 and the circular groove 432 also anchors the heat stake 410 in a direction normal to the direction in which the components 410, 440, 450, 420 are attached. This anchoring prevents the heat stake 410 from moving within a gap 414 between the heat stake 410 and an inner surface of the aperture 430 formed due to the differing diameters of the heat stake 410 and the aperture 430. Heat staking in the above described manner reduces play between the ink manifold 400, compression seal 440, die module 450 and heat sink 420, and allows a reliable seal to be formed.

The ink manifold can be formed in any shape suitable for use in an inkjet cartridge. The ink manifold can be formed from any substance suitable for storing ink. Exemplary materials include, but are not limited to noryl resin and/or polyether imide, in view of these materials' properties with respect to resistance to ink, formability and strength. The ink manifold can be provided with one or more heat stakes. The one or more heat stakes can be formed in any shape suitable for communicating with the one or more apertures of the heat sink. The heat stakes can be formed of the same or different material than the ink container, so long as that material is suitable for heat staking.

The compression seal can be formed in any shape suitable for use in joining the ink manifold to the die module. The compression seal can be formed from any material suitable for joining the ink manifold and the die module. In various exemplary embodiments, the compression seal has good sealing properties and resistance to ink, gas permeability and moisture permeability. In various exemplary embodiments, the compression seal is formed from an elastomer or rubber. In some such embodiments, the compression seal is formed from butyl rubber.

The die module can be any die module suitable for inkjet printing operations. An exemplary die module usable in the method of the present invention is described in U.S. Pat. No. 6,460,965, which, as noted above, is incorporated herein by reference in its entirety. The die module can include a heater element board and a passage board, which are joined together. The heater element board and passage board can be formed by working silicon wafers. The passage board can include multiple nozzles formed in one end face, passages communicating with the nozzles, a common liquid chamber communicating with the passage and a heater element situated in the face of the passages. The common liquid chamber can communicate with each passage and be connected to a supply passage that provides ink to the die module. The back side of the surface on which the nozzles are formed can be provided with an electric signal terminal. The side of the common liquid chamber provided with the heater element can include a driving circuit for driving the heater element.

The heat sink can be formed in any suitable shape. The heat sink can be a plate or other object formed from any substance suitable for conducting thermal energy. In various exemplary embodiments, the heat sink can be formed from aluminum, copper or a thermally conductive polymer. The heat sink can be formed by any known or later developed method including, but not limited to, die casting and fine-blank casting. When the die module is in operation, excess thermal energy is created, which can adversely affect printing operations. The heat sink functions to absorb the excess thermal energy. The heat sink can include one or more apertures. The one or more apertures can have any shape suitable for accommodating the heat stakes. The apertures can be formed with one or more three-dimensional features, such as the annular grooves described above. The one or more apertures and their respective associated three-dimensional features can be formed when the heat sink is manufactured, or alternatively can be formed later by any suitable method for forming apertures in the particular material from which the heat sink is formed.

Figure 5A:
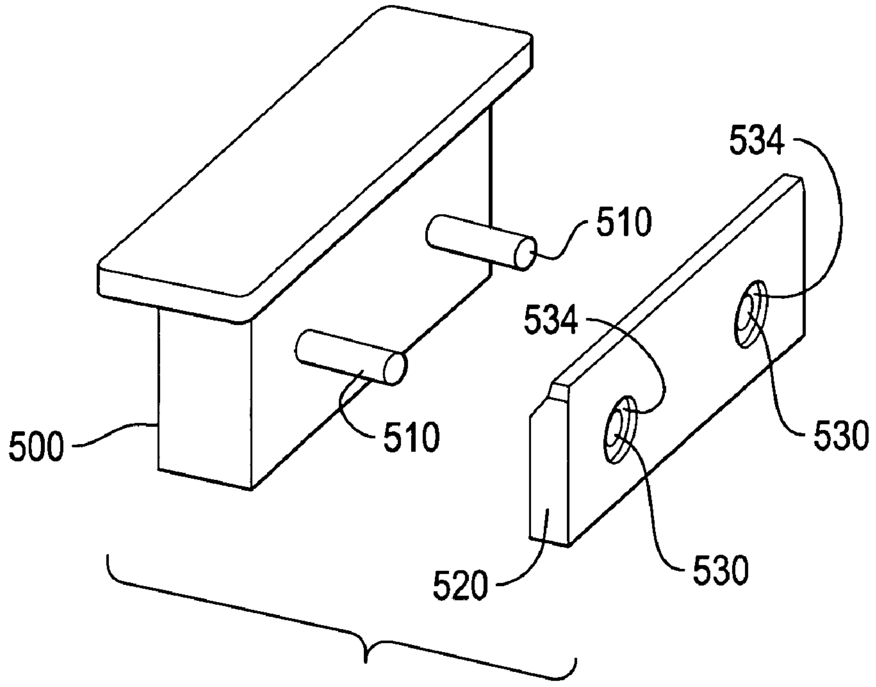
FIG. 5A shows an ink manifold and an exemplary embodiment of the heat sink according to this invention, prior to joining by an exemplary embodiment of the method according to this invention.

FIG. 5A shows an ink manifold 500 and an exemplary embodiment of the heat sink 520 according to this invention. The ink manifold 500 includes heat stakes 510 protruding from the body of the ink manifold 500. The heat sink 520 includes apertures 530 for receiving the heat stakes 510. The heat sink 520 is provided with circular wells 534 in a face of the heat sink 520, each surrounding a respective aperture 530. In various exemplary embodiments of the method for joining a fluid container and a fluid ejector according to this invention, a compression seal (not shown) is interposed between the ink manifold 500 and a die module (not shown). In various exemplary embodiments, the die module is interposed between the compression seal and the heat sink 520. With the ink manifold 500, compression seal, die module and heat sink 520 so arranged, the heat stakes 510 are inserted into the apertures 530 of the heat sink 520 so that an end of each heat stake 510 protrudes from a respective aperture 530. In various exemplary embodiments, the ink manifold 500, compression seal, die module and heat sink 520 are held together with force applied in the direction the respective parts are to be attached, and thermal energy is applied to the protruding ends of the heat stakes 510 so that the so that the ends are deformed to at least partially fill the apertures 530 and the circular wells 534 surrounding the apertures 530.

Figure 5B:
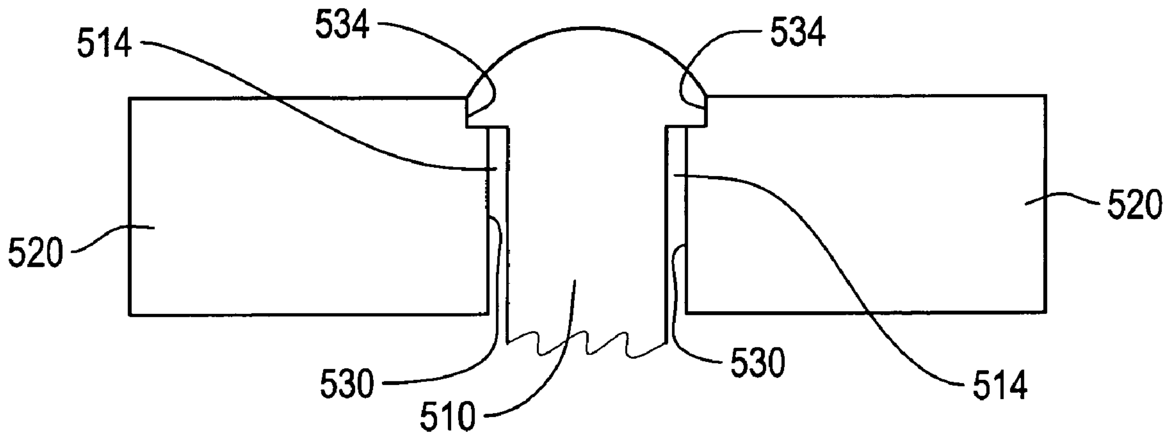
FIG. 5B shows a schematic cross section view of a heat stake joined to an exemplary embodiment of the heat sink according to this invention, after joining by an exemplary embodiment of the method according to this invention.

FIG. 5B shows a schematic cross section view of one of the heat stakes 510 deformed to occupy one of the apertures 530 of the heat sink 520, and the circular well 534 surrounding that aperture 530. By virtue of the presence of each circular well 534, the molten end of the heat stake 510 can contact surfaces both normal and parallel to the direction in which the ink manifold 500, compression seal, die module and heat sink 520 are attached as the molten end cools. As with the circular grooves 432 shown in FIGS. 4A and 4B, this contact with the circular well 534 can prevent the formation of a gap between the deformed end of the heat stake 510 and the face of the heat sink 520. The contact between the molten end of the heat stake 510 and the circular well 534 also anchors the heat stake 510 in a direction normal to the direction in which the above mentioned components are attached. This anchoring prevents the heat stake 510 from moving within a gap 514 between the heat stake 510 and an inner surface of the aperture 530 formed due to the differing diameters of the heat stake 510 and the aperture 530. Heat staking in the above described manner reduces play between the ink manifold 500, compression seal, die module and heat sink 520, and allows a reliable seal to be formed.

Figure 6A:
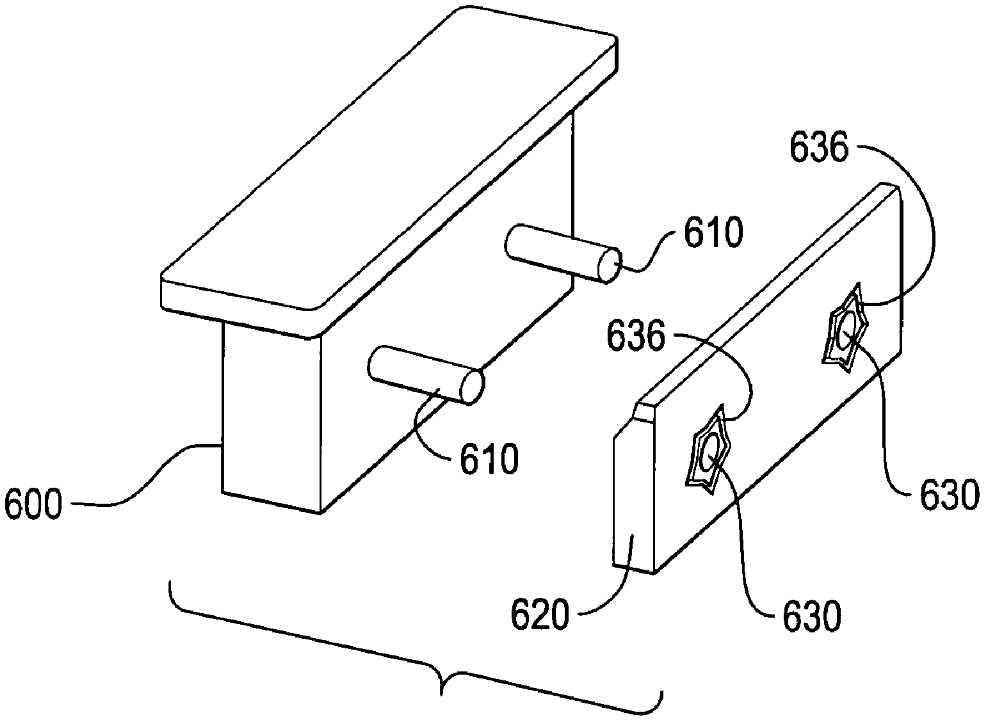
FIG. 6A shows an ink manifold and an exemplary embodiment of the heat sink according to this invention, prior to joining by an exemplary embodiment of the method according to this invention.

FIG. 6A shows an ink manifold 600 and an exemplary embodiment of the heat sink 620 according to this invention. The ink manifold 600 includes heat stakes 610 protruding from the body of the ink manifold 600. The heat sink 620 includes apertures 630 for receiving the heat stakes 610. The heat sink 620 is provided with star-shaped grooves 636 each surrounding a respective aperture 630. In various exemplary embodiments of the method for joining a fluid container and a fluid ejector according to this invention, a compression seal (not shown) is interposed between the ink manifold 600 and a die module (not shown). In various exemplary embodiments, the die module is interposed between the compression seal and the heat sink 620. With the ink manifold 600, compression seal, die module and heat sink 620 so arranged, the heat stakes 610 are inserted into the apertures 630 of the heat sink 620 so that an end of each heat stake 610 protrudes from a respective aperture 630. In various exemplary embodiments, the ink manifold 600, compression seal, die module and heat sink 620 are held together with force applied in the direction the respective parts are to be attached, and thermal energy is applied to the protruding ends of the heat stakes 610 so that the so that the ends are deformed to at least partially fill the apertures 630 and the star-shaped grooves 636 surrounding the apertures 630.

Figure 6B:
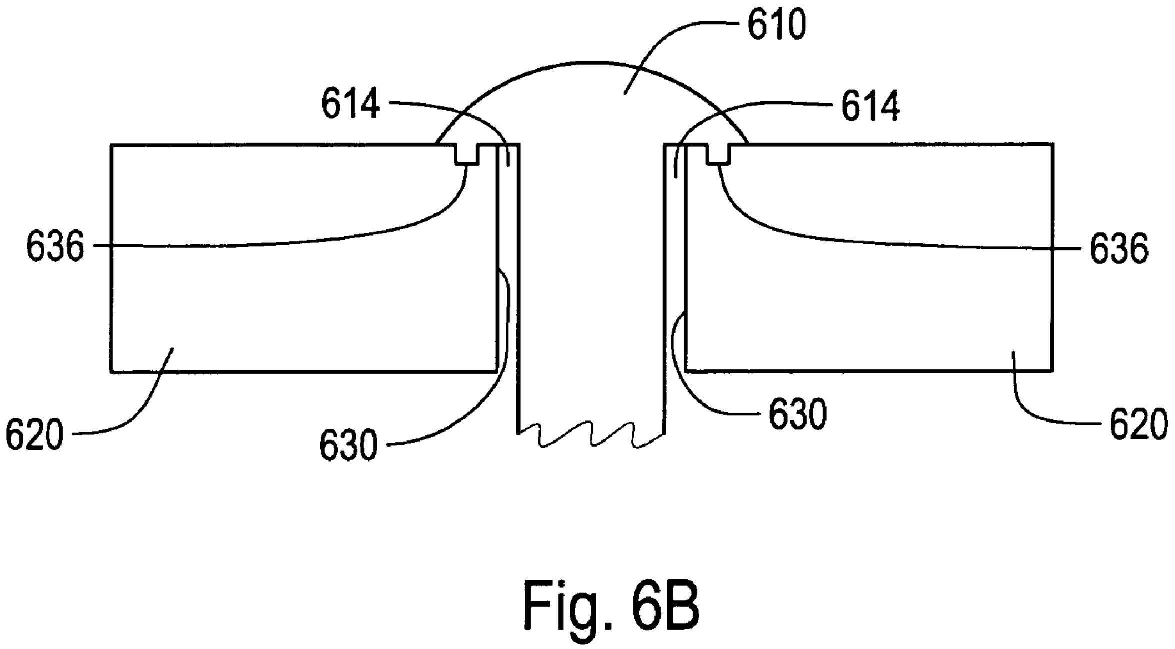
FIG. 6B shows a schematic cross section view of a heat stake joined to an exemplary embodiment of the heat sink according to this invention, after joining by an exemplary embodiment of the method according to this invention.

FIG. 6B shows a schematic cross section view of one of the heat stakes 610 deformed to occupy one of the apertures 630 of the heat sink 620, including the star-shaped grooves 636 surrounding that aperture 630. By virtue of the presence of each star-shaped groove 636, the molten end of the heat stake 610 can contact surfaces both normal and parallel to the direction in which the ink manifold 600, compression seal, die module and heat sink 620 are attached as the molten end cools. As with the circular grooves 432 shown in FIGS. 4A and 4B and the circular wells 534 shown in FIGS. 5A and 5B, this contact with the star-shaped groove 636 can prevent the formation of a gap between the deformed end of the heat stake 610 and the face of the heat sink 620. The contact between the molten end of the heat stake 610 and the star-shaped groove 636 also anchors the heat stake 610 in a direction normal to the direction in which the above mentioned components are attached. This anchoring prevents the heat stake 610 from moving within a gap 614 between the heat stake 610 and an inner surface of the aperture 630 formed due to the differing diameters of the heat stake 610 and the aperture 630. Heat staking in the above described manner reduces play between the ink manifold 600, compression seal, die module and heat sink 620, and allows a reliable seal to be formed.

In addition to these benefits, the star-shaped groove 636 prevents rotation of the heat sink 620 with respect to the heat stakes 610. This is particularly useful in applications in which only one heat stake is used to stake a heat sink or other substrate having only one respective aperture. Applications using only one heat stake do not have the benefit of additional heat stake-aperture couplings to prevent rotation. In such applications, a non-circular three-dimensional feature or a three-dimensional feature that is situated asymmetrically about an aperture will prevent rotation when engaged by the molten end of the heat stake. It should be appreciated that, while a star-shaped groove is shown in FIGS. 6A and 6B, any non-circular three-dimensional feature in the vicinity of an aperture would serve this rotation-preventing function.

While the exemplary three-dimensional features described herein are grooves and wells, or features that are set into the heat sink, it should be appreciated that such features could also be protruding features, or features that extend out from the heat sink.

Figure 7A:
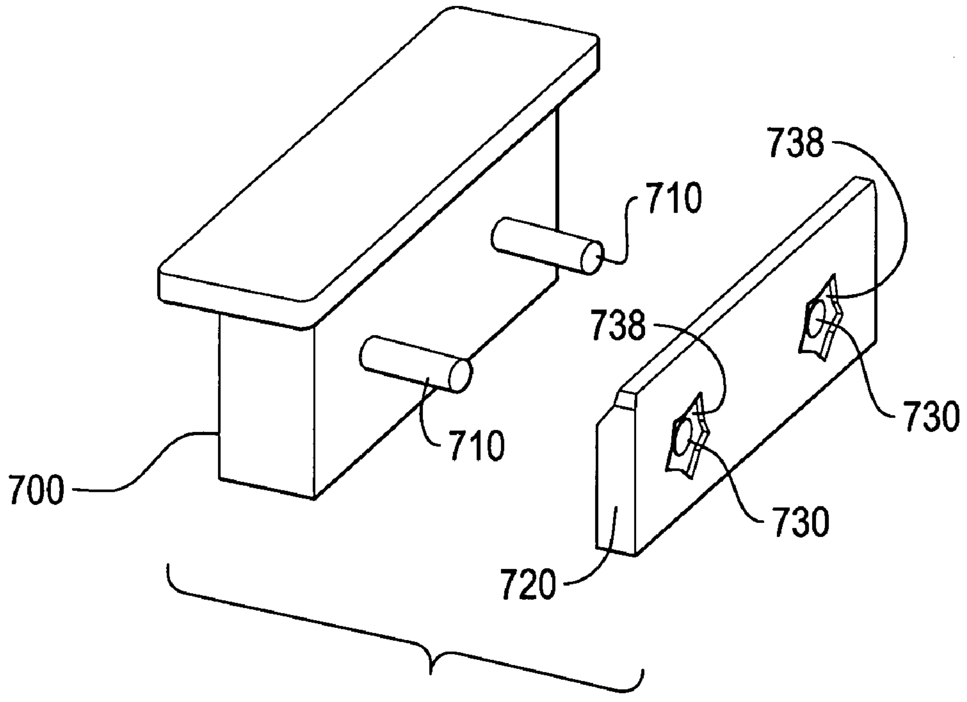
FIG. 7A shows an ink manifold and an exemplary embodiment of the heat sink according to this invention, prior to joining by an exemplary embodiment of the method according to this invention.

FIG. 7A shows an ink manifold 700 and an exemplary embodiment of the heat sink 720 according to this invention. The ink manifold 700 includes heat stakes 710 protruding from the body of the ink manifold 700. The heat sink 720 includes apertures 730 for receiving the heat stakes 710. The heat sink 720 is provided with star-shaped wells 738 in the face of the heat sink 720, each surrounding a respective aperture 730. In various exemplary embodiments of the method for joining a fluid container and a fluid ejector according to this invention, a compression seal (not shown) is interposed between the ink manifold 700 and a die module (not shown). In various exemplary embodiments, the die module is interposed between the compression seal and the heat sink 720. With the ink manifold 700, compression seal, die module and heat sink 720 so arranged, the heat stakes 710 are inserted into the apertures 730 of the heat sink 720 so that an end of each heat stake 710 protrudes from a respective aperture 730. In various exemplary embodiments, the ink manifold 700, compression seal, die module and heat sink 720 are held together with force applied in the direction the respective parts are to be attached, and thermal energy is applied to the protruding ends of the heat stakes 710 so that the ends are deformed to at least partially fill the apertures 730 and the star-shaped wells 738 surrounding the apertures 730.

Figure 7B:
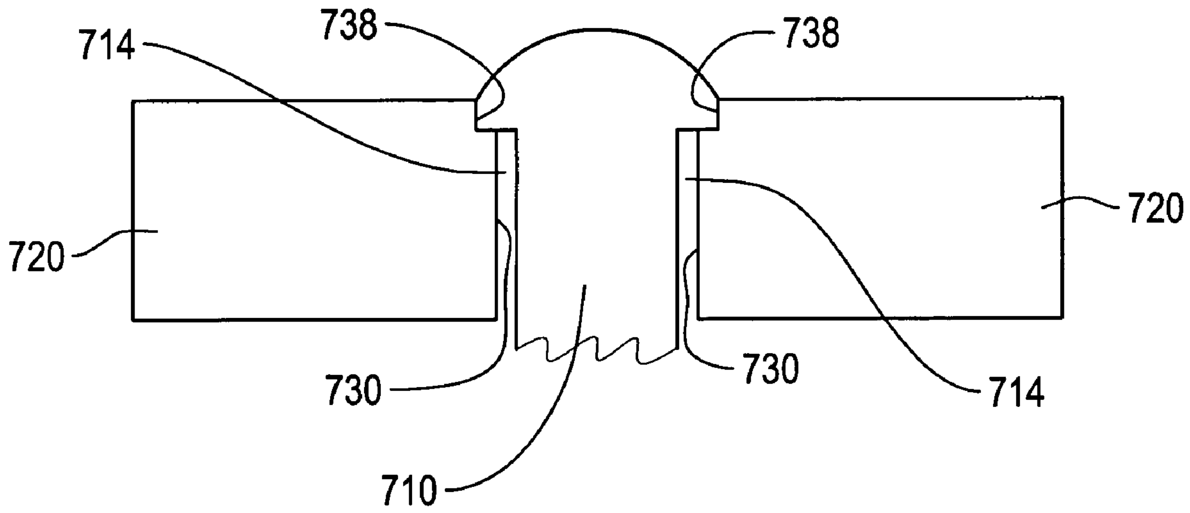
FIG. 7B shows a schematic cross section view of a heat stake joined to an exemplary embodiment of the heat sink according to this invention, after joining by an exemplary embodiment of the method according to this invention.

FIG. 7B shows a schematic cross section view of one of the heat stakes 710 deformed to occupy one of the apertures 730 and the surrounding star-shaped well 738 of the heat sink 720. By virtue of the presence of each star-shaped well 738, the molten end of the heat stake 710 can contact surfaces both normal and parallel to the direction in which the ink manifold 700, compression seal, die module and heat sink 720 are attached as the molten end cools. This contact with the star-shaped well 738 can prevent the formation of a gap between the deformed end of the heat stake 710 and the face of the heat sink 720. The contact between the molten end of the heat stake 710 and the star-shaped well 738 also anchors the heat stake 710 in a direction normal to the direction in which the above mentioned components are attached. This anchoring prevents the heat stake 710 from moving within a gap 714 between the heat stake 710 and an inner surface of the aperture 730 formed due to the differing diameters of the heat stake 710 and the aperture 730. In addition, the star-shaped well 738 prevents rotation of the heat sink 720 with respect to the heat stakes 710. Heat staking in the above described manner reduces play between the ink manifold 700, compression seal, die module and heat sink 720, and allows a reliable seal to be formed.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later developed alternative, modifications, variations, improvements, and/or substantial equivalents.

What is claimed is:

1. A method for joining a fluid container and a fluid ejector, comprising:

arranging a fluid container including at least one heat stake, a fluid ejector and a substrate in order, the substrate including a first surface, at least one aperture having an opening in the first surface, and at least one three-dimensional structure disposed in the vicinity of the at least one aperture, the at least one three-dimensional structure surrounding the opening and including a second surface substantially orthogonal to the first surface at a boundary where the second surface meets the first surface, the at least one three-dimensional structure being a groove;

applying pressure to the arranged fluid container, fluid ejector and substrate to bring the arranged fluid container, fluid ejector and substrate into respective contact and to cause the at least one heat stake to be inserted into the at least one aperture; and applying thermal energy from an external heat source to the at least one heat stake so that the at least one heat stake deforms to at least partially fill the at least one aperture and the at least one three-dimensional structure.

2. The method of claim 1, wherein the fluid container is an ink manifold.

3. The method of claim 1, wherein the fluid ejector is a die module.

4. The method of claim 1, wherein the substrate is a heat sink.

5. The method of claim 1, wherein the fluid container includes two heat stakes and the substrate includes two apertures.

6. The method of claim 1, wherein at least one of the at least one three-dimensional structure is a circular groove surrounding the at least one aperture.

7. The method of claim 1, wherein at least one of the at least one three-dimensional structure is a non-circular groove surrounding the at least one aperture.

8. The method of claim 1, wherein an elastic member is interposed between the fluid container and the fluid ejector.

9. The method of claim 8, wherein the elastic member is a compression seal.

10. A method for joining two dissimilar materials for precision alignment using a heat staking control feature, comprising:

placing a first object adjacent to a second object, the first object including at least one heat stake and the second object including a surface, at least one aperature, and at least one three-dimensional structure disposed in the vicinity of the at least one aperture, the three-dimensional structure having a wall that is substantially orthogonal to the surface, the at least one three-dimensional structure being a groove surrounding the aperture;

applying pressure to bring the first object and the second object into proximity and to cause the at least one heat stake to be inserted into the at least one aperture; and applying thermal energy from an external heat source to the at least one heat stake so that the at least one heat stake deforms to at least partially fill the at least one aperture and the at least one three-dimensional structure.

11. A method for joining a fluid container and a fluid ejector, comprising:

arranging a fluid container including at least one heat stake, a fluid ejector and a substrate in order, the substrate including at least one aperture and at least one three-dimensional structure disposed in the vicinity of the at least one aperture, the at least one three-dimensional structure being a groove that is a recess about the at least one aperture;

applying pressure to the arranged fluid container, fluid ejector and substrate to bring the arranged fluid container, fluid ejector and substrate into respective contact and to cause the at least one heat stake to be inserted into the at least one aperture; and applying thermal energy from an external heat source to the at least one heat stake so that the at least one heat stake deforms to at least partially fill the at least one aperture and the groove.

12. The method of claim 11, wherein the fluid container is an ink manifold.

13. The method of claim 11, wherein the fluid ejector is a die module.

14. The method of claim 11, wherein the substrate is a heat sink.

15. The method of claim 11, wherein the fluid container includes two heat stakes and the substrate includes two apertures.

16. The method of claim 11, wherein at least one of the at least one three-dimensional structure is a circular groove surrounding the at least one aperture.

17. The method of claim 11, wherein an elastic member is interposed between the fluid container and the fluid ejector.

* * * * *